(12) United States Patent  (10) Patent No.: US 8,274,367 B2
Maeda et al.  (45) Date of Patent: Sep. 25, 2012

(54) RFID SYSTEM AND RFID TAG

(75) Inventors: Tomohiko Maeda, Kawasaki (JP); Kazuo Sato, Kawasaki (JP); Yoshitaka Muraoka, Kawasaki (JP); Hidehiko Fuchida, Kawasaki (JP); Shuko Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 12/074,057

(22) Filed: Feb. 29, 2008

(65) Prior Publication Data

US 2008/0218349 A1  Sep. 11, 2008

(30) Foreign Application Priority Data

Mar. 8, 2007 (JP) .................................. 2007-059272

(51) Int. Cl.
H04Q 5/22 (2006.01)
(52) U.S. Cl. ..................... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/280; 235/281; 235/282; 235/282.5; 235/283; 235/284; 235/285
(58) Field of Classification Search ........ 340/10.1–10.6, 340/572.1–572.9; 235/375–385
See application file for complete search history.

(56) References Cited

U.S. PATENT DOCUMENTS

| 6,128,626 | A | * | 10/2000 | Beauchesne | ......................... | 1/1 |
| 6,913,199 | B2 | * | 7/2005 | He | ................................ | 235/454 |
| 7,053,995 | B1 | | 5/2006 | Anderson et al. | | |
| 7,252,241 | B2 | * | 8/2007 | Yamada | ......................... | 235/492 |
| 7,677,441 | B2 | * | 3/2010 | Bernstein et al. | ............. | 235/379 |
| 2003/0046286 | A1 | * | 3/2003 | Jacobs et al. | ...................... | 707/8 |
| 2003/0061245 | A1 | * | 3/2003 | Soria et al. | ...................... | 707/203 |
| 2003/0163396 | A1 | * | 8/2003 | Blankevoort et al. | ........... | 705/28 |
| 2003/0209601 | A1 | * | 11/2003 | Chung | ........................... | 235/385 |
| 2003/0229764 | A1 | * | 12/2003 | Ohno et al. | ................... | 711/147 |
| 2004/0084520 | A1 | * | 5/2004 | Muehl et al. | ................... | 235/376 |
| 2005/0185217 | A1 | | 8/2005 | Nishizawa et al. | | |
| 2006/0080732 | A1 | * | 4/2006 | Ohkubo et al. | ................... | 726/9 |
| 2006/0111813 | A1 | | 5/2006 | Nishiyama | | |

(Continued)

FOREIGN PATENT DOCUMENTS

CN 1466030 A 1/2004

(Continued)

OTHER PUBLICATIONS

Chinese Office Action issued Sep. 18, 2009 in corresponding Chinese Patent Application 200810082922.6.

(Continued)

*Primary Examiner* — George Bugg
*Assistant Examiner* — Paul Obiniyi
(74) *Attorney, Agent, or Firm* — Fujitsu Patent Center

(57) ABSTRACT

In an RFID system comprising a detection unit for detecting an RFID tag and a control unit for exercising the control concerning the RFID tag, a determination unit determines whether to access a second area of an RFID tag comprising storage area, comprising of a first area for storing ID information and the second area for storing command information. An extraction unit extracts command information from the second area when it is determined to access the second area. An execution unit performs a process corresponding to the command information extracted by the extraction unit.

9 Claims, 23 Drawing Sheets

U.S. PATENT DOCUMENTS

| | | | |
|---|---|---|---|
| 2006/0123066 A1* | 6/2006 | Jacobs et al. | 707/202 |
| 2006/0143139 A1* | 6/2006 | Wong et al. | 705/75 |
| 2006/0145817 A1* | 7/2006 | Aikawa et al. | 340/10.3 |
| 2006/0223340 A1 | 10/2006 | Yoneda | |
| 2006/0273882 A1* | 12/2006 | Posamentier | 340/10.4 |
| 2007/0069863 A1* | 3/2007 | Akiyama et al. | 340/10.2 |
| 2007/0178935 A1* | 8/2007 | Shim et al. | 455/552.1 |
| 2007/0188328 A1* | 8/2007 | Mochizuki et al. | 340/572.7 |
| 2007/0293155 A1* | 12/2007 | Liao et al. | 455/41.2 |
| 2007/0299887 A1* | 12/2007 | Novik et al. | 707/203 |
| 2008/0001721 A1* | 1/2008 | Tanaka | 340/10.31 |
| 2009/0115582 A1* | 5/2009 | Kim | 340/10.2 |
| 2009/0160615 A1* | 6/2009 | O'Brien et al. | 340/10.1 |
| 2009/0160649 A1* | 6/2009 | O'Brien et al. | 340/572.1 |
| 2009/0303018 A1* | 12/2009 | Catteau | 340/10.6 |

FOREIGN PATENT DOCUMENTS

| | | | |
|---|---|---|---|
| CN | 1660590 A | | 8/2005 |
| EP | 1 750 185 A2 | | 2/2007 |
| JP | 11212846 A | * | 8/1999 |
| JP | 2006-286966 A | | 10/2006 |
| JP | 2007-47970 A | | 2/2007 |
| JP | 2007-94827 A | | 4/2007 |
| KR | 2004-0083966 | | 10/2004 |
| TW | 482896 | | 4/2011 |

OTHER PUBLICATIONS

Korean Office Action dated Nov. 23, 2009 issued in corresponding Korean Patent Application 10-2008-0019620.

European Search Report dated Dec. 20, 2010 and issued in corresponding European Patent Application 08152045.4.

Japanese Office Action mailed Feb. 28, 2012 for corresponding Japanese Application No. 2007-059272, with Partial English-language Translation.

Taiwanese Office Action mailed Mar. 27, 2012 for corresponding Taiwanese Application No. 97106445, with Partial English-language Translation.

* cited by examiner

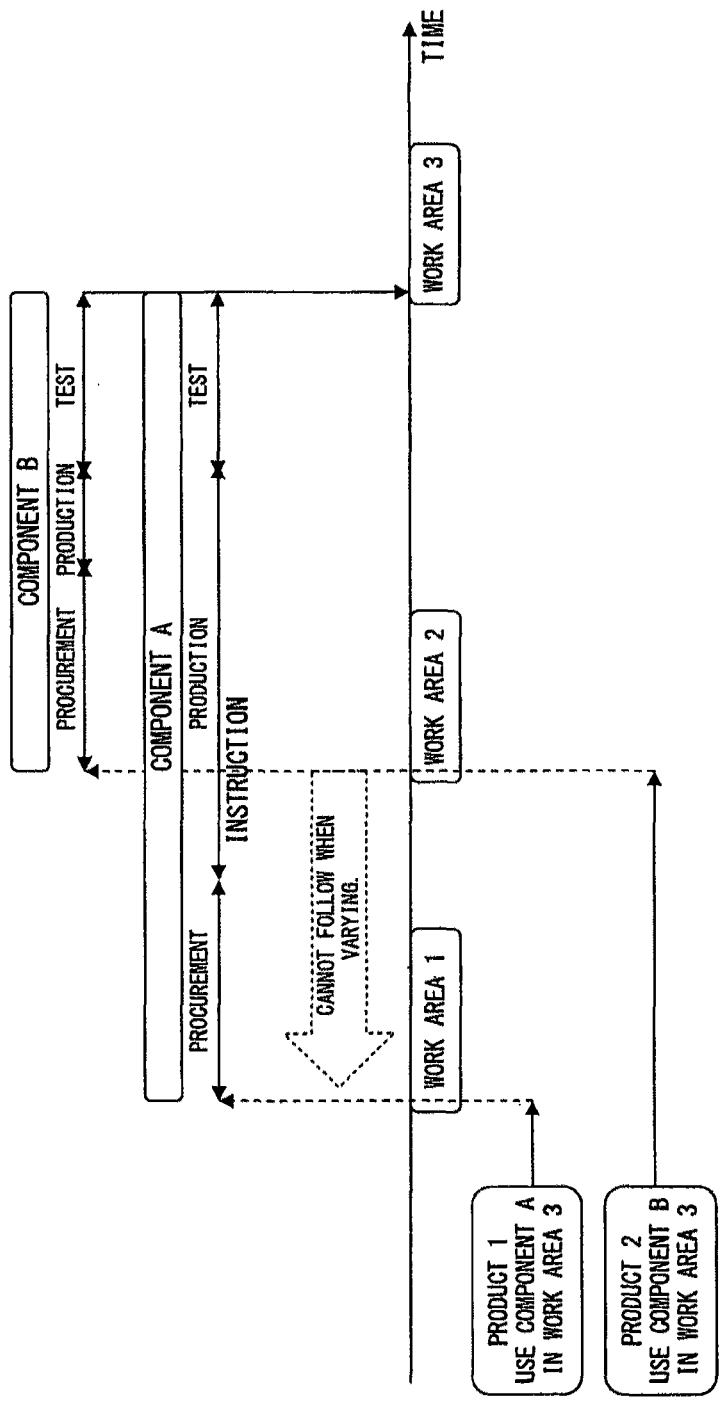
F I G. 6

TAG STATE 1
01-01B, COMMAND, QUALITY ANALYSIS (0,0,0,50), NULL
02, COMMAND, TEST (50,0), NULL

TAG STATE 2
01-01B, COMMAND, QUALITY ANALYSIS (3μF, 0.05V, 980Å, 50), CHK
02, COMMAND, TEST (50,0), NULL

TAG STATE 3
01-01B, COMMAND, QUALITY ANALYSIS (3μF, 0.05V, 980Å, 93db), OK
02, COMMAND, TEST (50,0), NULL

TAG STATE 4
01-01B, COMMAND, QUALITY ANALYSIS (3μF, 0.05V, 980Å, 93db), OK
02, COMMAND, TEST (50, NG), OK

TAG STATE 5
01-01B, COMMAND, QUALITY ANALYSIS (3μF, 0.02V, 800Å, 90db), OK
02, COMMAND, TEST (50, NG), OK

TAG STATE 6
01-01B, COMMAND, QUALITY ANALYSIS (3μF, 0.9V, 700Å, 120db), OK
02, COMMAND, TEST (50, OK), OK

F I G. 1 5

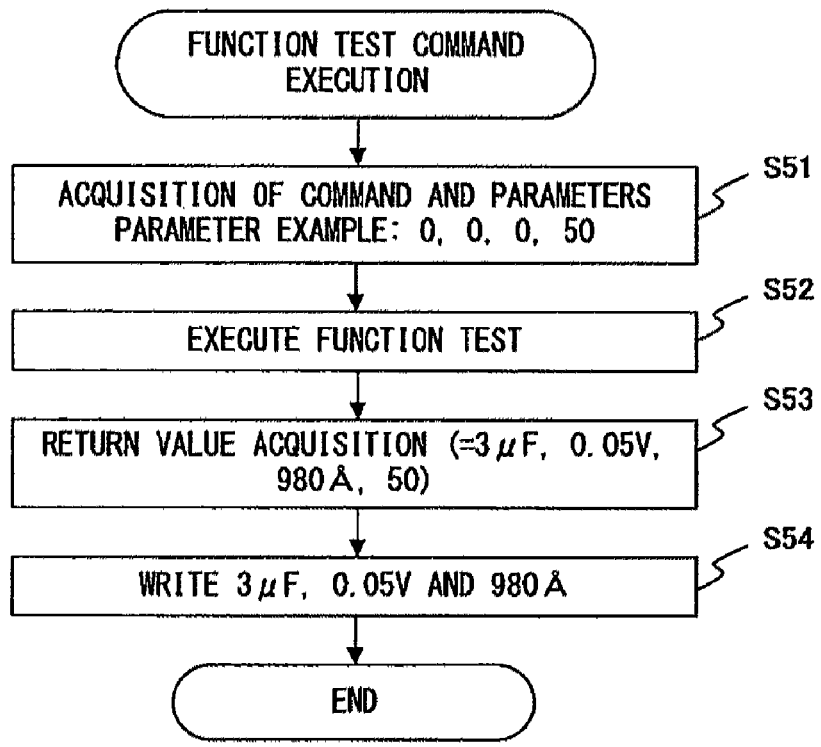
F I G. 17 A

RFID SYSTEM AND RFID TAG

CROSS REFERENCE TO RELATED APPLICATIONS

This application is based on and hereby claims priority to Japanese Patent Application No. Japanese Application 2007-059272 filed Mar. 8, 2007, the contents of which are hereby incorporated by reference.

BACKGROUND OF THE INVENTION

1. Field of the Invention

The present invention relates to a technology for managing products or the like using an individual recognition technique by radio frequency identification (RFID).

2. Description of the Related Art

Currently, an individual recognition technique by RFID is applied to various fields of manufacturing, physical distribution, apparel and the like. As an example, the case of introducing the RFID system to a production line is described below. An RFID tag is attached to a product or its component in advance. When an antenna allocated along the production line detects the RFID tag while a worker is performing a manufacturing process, the test process of a product or the like on a production line, information about the product or component, such as its work contents, a test result or the like is sequentially written into the RFID tag. By referring to the data stored in the RFID tag, the state of a component or product to which the RFID tag is managed.

FIG. 1 shows each process in the case where a conventional RFID system is introduced to a production line. A product 150 is sequentially conveyed to a work area 1, a work area 2 and so on and a prescribed process is applied to it in each work area. In the example shown in FIG. 1, in the work area 1 the history data of the product is written into the RFID tag, in the work area 2 a threshold used in a test in a test area is calculated, in the work area 3 the process management is carried out and in the work area 4 a function test is conducted. In this way, process contents which the control unit of the RFID system applies to the RFID tag in each work area are prescribed.

In the conventional RFID system, the control unit side, that is, the RFID system side has all the process functions executed for the RFID tag in each work area. The RFID tag has data necessary for processes and when the RFID system detects the RFID tag by its antenna, the control unit reads necessary data from the RFID system and performs various processes.

FIG. 2 shows the processing method of the conventional control system. Conventionally, the control unit, that is, the system side has information about the contents to be processed and their process order. Therefore, the control unit sequentially executes subroutines according to the information held by the control unit using the fact that the antenna of the system detects the RFID tag as a trigger.

FIG. 3 shows the technical problem of the conventional RFID system. In the work area 1, history data is written into the RFID tag. In the work area 2, the threshold(s) used in a test of a component or product to which the RFID tag is attached is (are) calculated. In the work area 3, process management, such as the issuance of "kanban (a just-in-time instruction)" or the like, is performed. In the test area, a function test is applied to a components or product to which the RFID tag is attached.

Firstly, the problem caused when the history data is written into the RFID tag is described. FIG. 4 shows the problem caused when the history data is inputted.

In the production line, the history to be recorded of a component or the like (a component and a product) is registered in a master database. Then, when the component is carried to the prescribed shelf of the work area and the antenna detects its existence, its version number registered in the master database (DB) is written into the RFID tag. The component or the like to which the RFID tag is attached is sequentially stored in the box placed on the shelf and is carried out to a subsequent work area when the storage into the box is completed. Another box is placed in the place where the old box was placed and the component is stored in the new box.

Conventionally, although the writing of the history data into the RFID tag is executed by the control unit of the RFID system, the master DB for managing a version number to be written is manually updated by reading using a bar code, manual input by a system manager or the like. Specifically, the master DB must be updated before another box is placed in the same place after a box filled by components is carried out of the work line and when the update timing of the master DB delays, there occurs a mismatch between the arrangement on the master DB of the component and actual arrangement and the version number of another already carried component is written into the RFID tag.

FIG. 5 shows the problem caused when a test is conducted. When conducting the test of a component or the like, since the RFID tag itself has no operation function, the RFID system calculates data used for the test, download test program, and conducts the test using data calculated.

A test, or its analysis and the like takes time, whereas a product to be tested moves on the carrier line while conducting the test and analyzing its result. Therefore, if abnormality is detected as a result of the test, the analysis of the test result in the control unit sometimes is not completed while the product is moving on the test line. If the process in the control unit cannot catch up with the moving speed of the line, sometimes a necessary operation can be performed in another system. However, in this case, the operation result from the other system must be awaited. In such a case, the carrier line must be stopped temporarily until the operation on the other system is completed.

FIG. 6 shows the problem caused in the process management. In this case, it is assumed that a prescribed work, such as the assembly or the like, of product 1 is executed firstly, and subsequently that of product 2 is executed in the work area 3 of the production line. It is also assumed that products 1 and 2 use components A and B, respectively.

According to just-in-time (JIT) system, "kanban" is issued taking into consideration a period needed from the procurement of a specific component to manufacturing and test of a product in such a way as to procure the component in a specific work area at a specific necessary time. In the example shown in FIG. 6, in order to procure component A for work area 3, kanban must be issued when component A exists in work area 2 and as to component B, kanban must be issued when component B exists in work area 1. In this way, the timing of issuing kanban depends on the type of a product (work) and differs for each type of a product (work).

Furthermore, the timing of issuing kanban differs every day depending on a work area, the type of a component and a lead time. However, conventionally since the control unit controls the timing of issuing kanban, in order to change the timing of issuing kanban every day, data stored in the control unit must be updated every day.

Although the process starts using the detection of the RFID tag in the control unit of the RFID system as a trigger, the sub routines are sequentially executed in the control unit before its result is written into the RFID tag after the process starts. Therefore, the RFID tag must wait for the completion of the writing of the result on the line. Since the RFID tag does not store process contents to be executed in each process and data used for each process and the RFID system controls them, a specific process according to a specific RFID tag cannot be performed in an appropriate timing, which is the problem.

SUMMARY OF THE INVENTION

It is an object of the present invention to provide a technology capable of recognizing and performing a process to be applied to each RFID tag in the RFID system.

In order to solve the above-described problem, the present invention is an RFID system comprising a detection unit for detecting an RFID tag and a control unit for exercising control of the RFID tag. The control unit comprises a determination unit determining whether to access a second area of an RFID tag comprising storage area, comprising of a first area for storing ID information and the second area for storing command information, an extraction unit extracting command information from the second area when it is determined to access the second area and an execution unit performing a process corresponding to the command information extracted by the extraction unit.

The determination unit determines which to use in order to control, ID information being data peculiar to an RFID tag or command information including a command to be executed in the control unit. When controlling using command information, command information to be executed is further extracted and executed. Thus, a prescribed process can be performed in the control unit in the timing of having detected the RFID tag.

The extraction unit can also refer to result information corresponded to the command information and identification information for distinguishing a process to be performed stored in the storage area and extracts command information corresponding to the identification information indicating a process that is not performed yet and should be performed in the control unit. Even when a plurality of pieces of command information is stored in the second area, the control unit can determine which process to perform.

The command information can also be comprised of a command indicating a process concerning a manufacturing process and a test process of a first article on a production line and parameter data used when executing the command.

Furthermore, the RFID system can further comprise a database for storing the first product and the version number information of the first product for each group of the first product corresponding to position information indicating a place where the first product is classified and stored. When an RFID tag attached to the second product classifying and storing the first product is detected, the control unit performs a process for reflecting the first product, the version number information and the position information of the first product that are stored in the RFID tag attached to the second product to the database. When the RFID tag attached to the first product is detected, the extraction unit can also extract command information indicating a process of reading the version number information from the database and writing the version into the RFID tag from the storage area of the RFID tag attached to the first product.

When the detection unit detects the RFID tag, the control unit can also sequentially perform a subsequent process to be performed using return values previously obtained by executing a command, according to commands of a computation process for obtaining data for test, a test and analysis process of a test result.

When the detection unit detects the RFID tag, the control unit can also perform a process for issuing a pro production instruction to a later process by a just-in-time system.

According to the present invention, when an RFID tag is recognized, a process to be performed can be performed in an appropriate timing on the basis of information stored in the second area of the RFID tag.

BRIEF DESCRIPTION OF THE DRAWINGS

FIG. 6 shows the problem caused in the process management.

FIG. 15 shows the state of a command data area.

FIG. 17A is a flowchart showing the test process in the RFID system (No. 2).

DESCRIPTION OF THE PREFERRED EMBODIMENTS

The preferred embodiments of the present invention are described in detail with reference to the drawings below.

Figure 1:
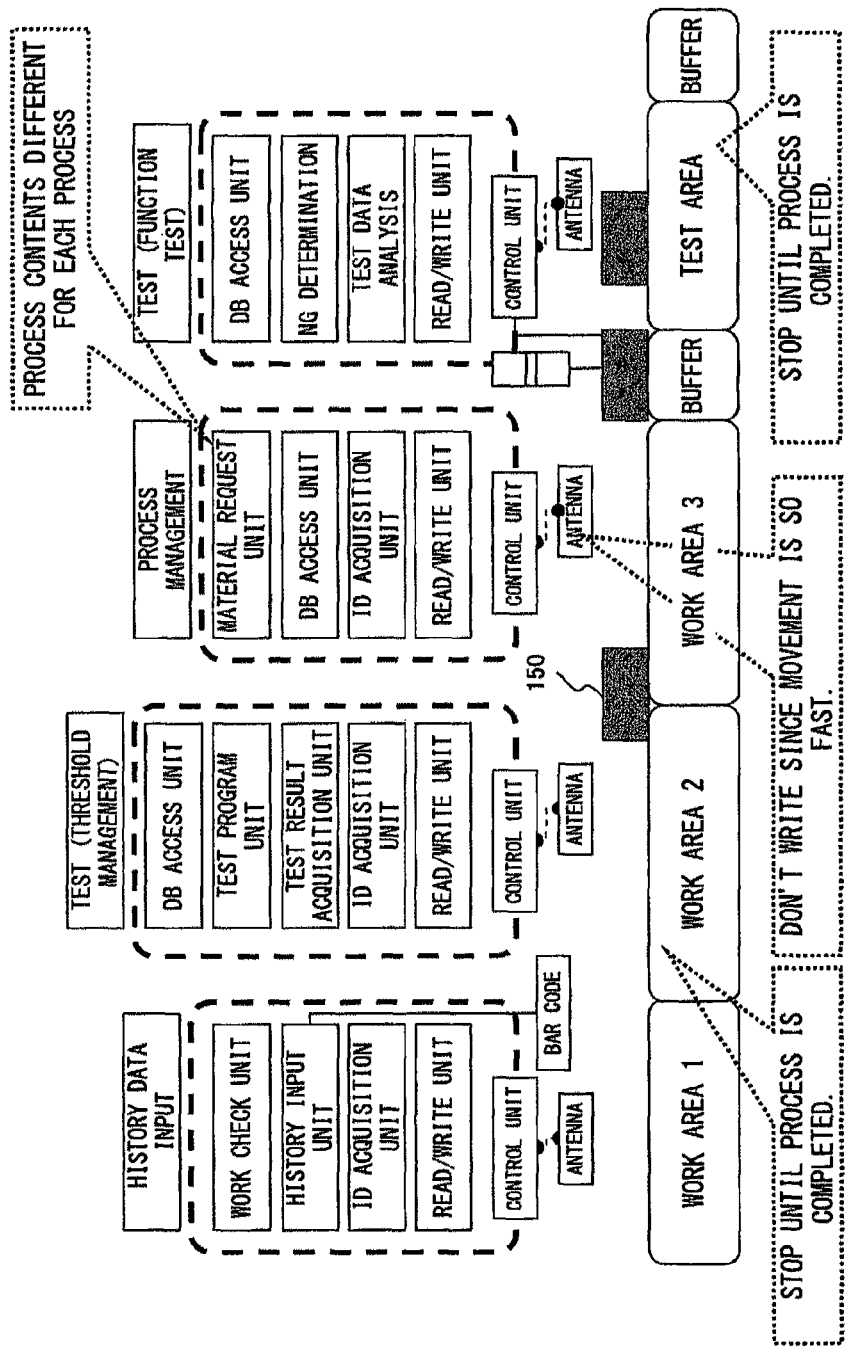
FIG. 1 shows each process in the case where a conventional RFID system is introduced to a production line.
Figure 2:
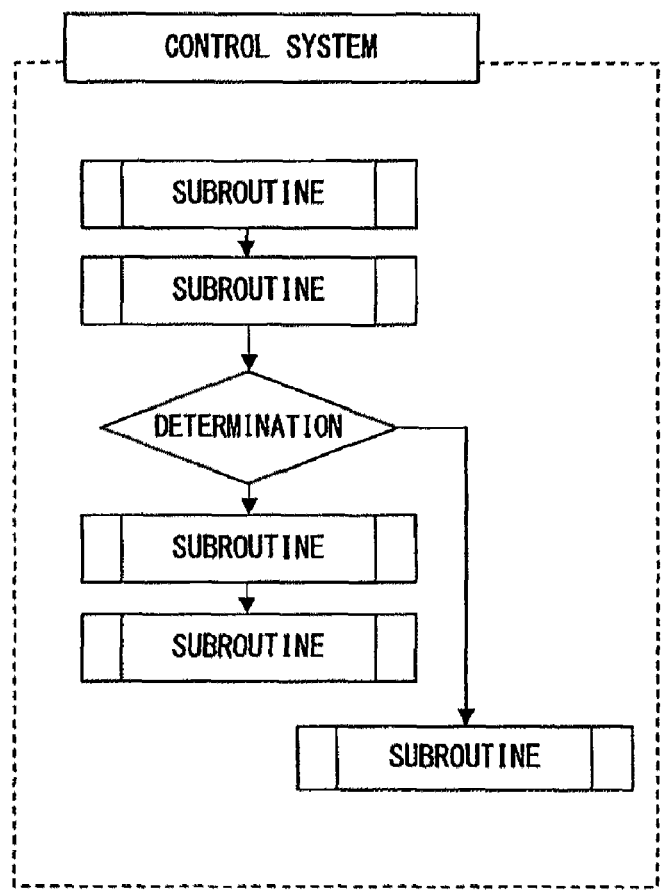
FIG. 2 shows the processing method of the conventional control system.
Figure 3:
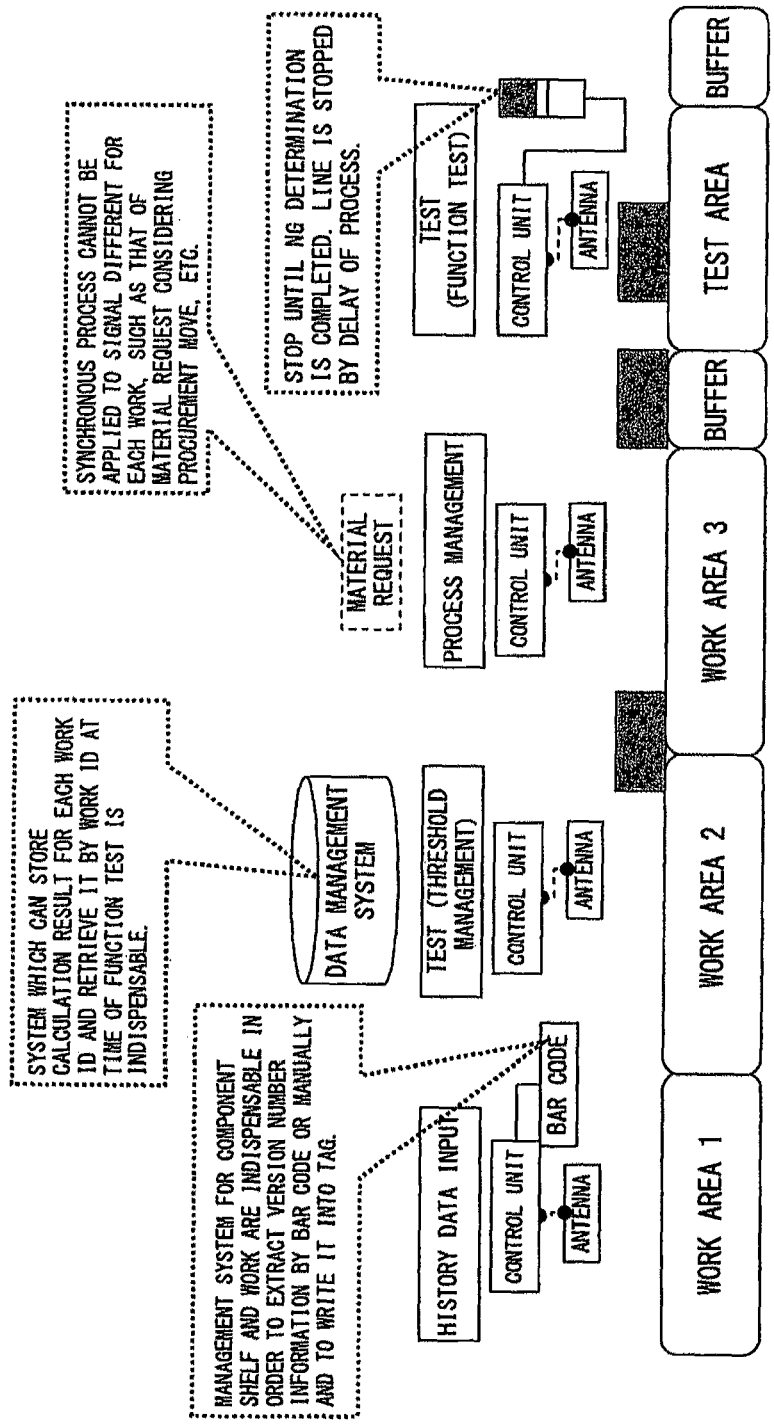
FIG. 3 shows the technical problem of the conventional RFID system.
Figure 4:
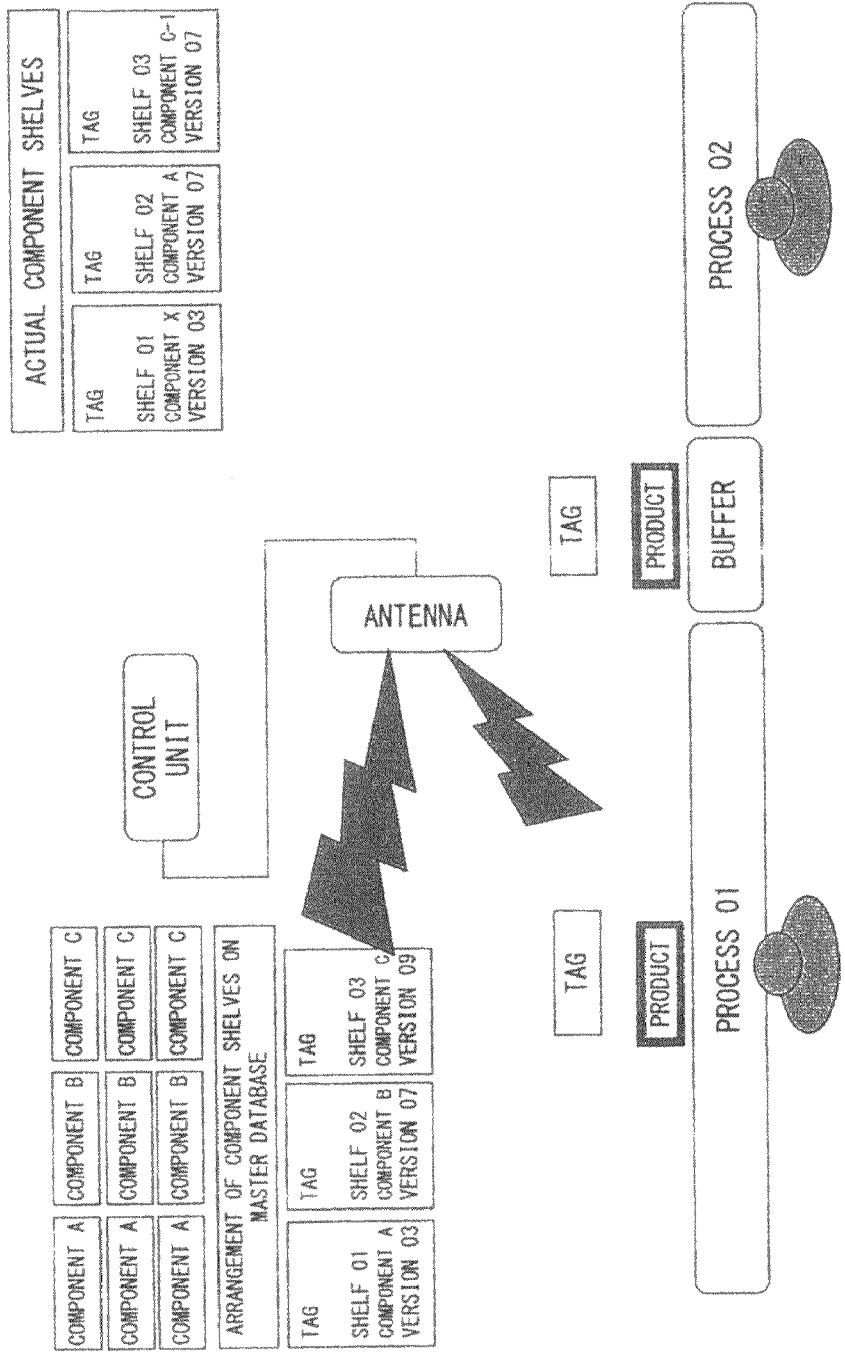
FIG. 4 shows the problem caused when the history data is inputted.
Figure 5:
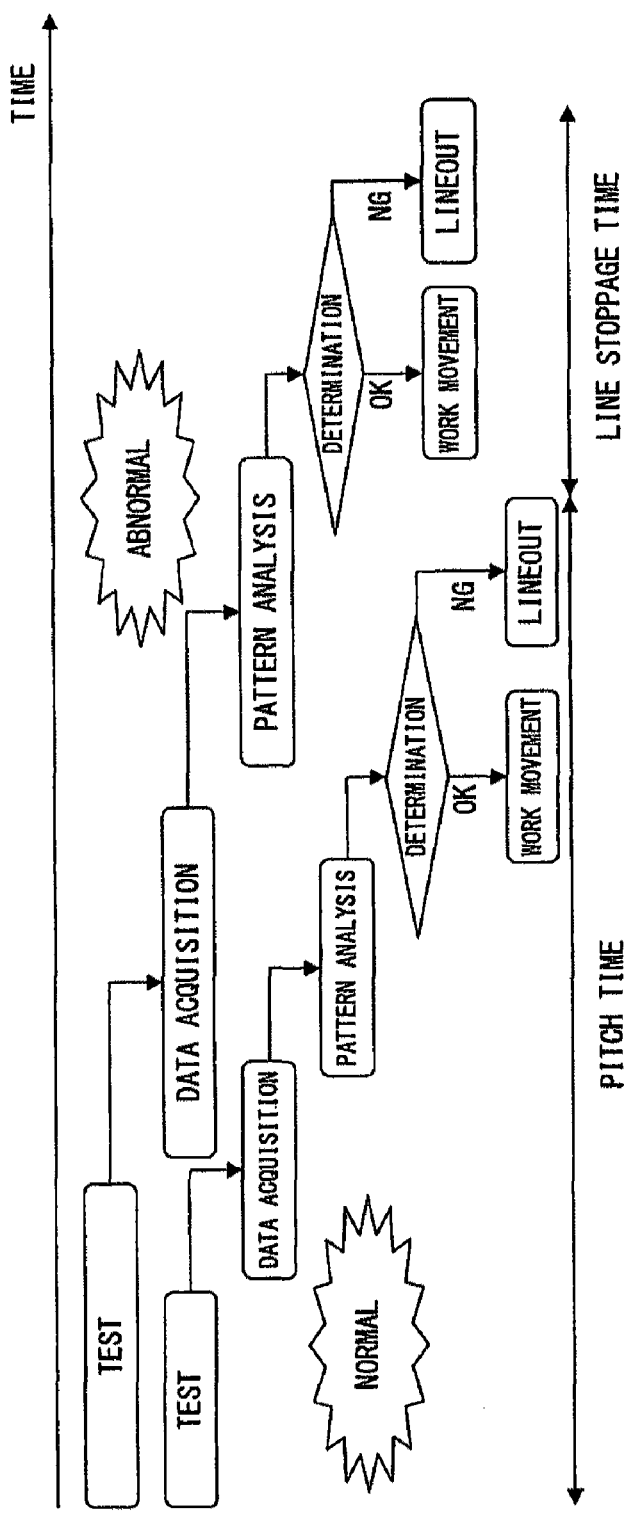
FIG. 5 shows the problem caused when a test is conducted.
Figure 7:
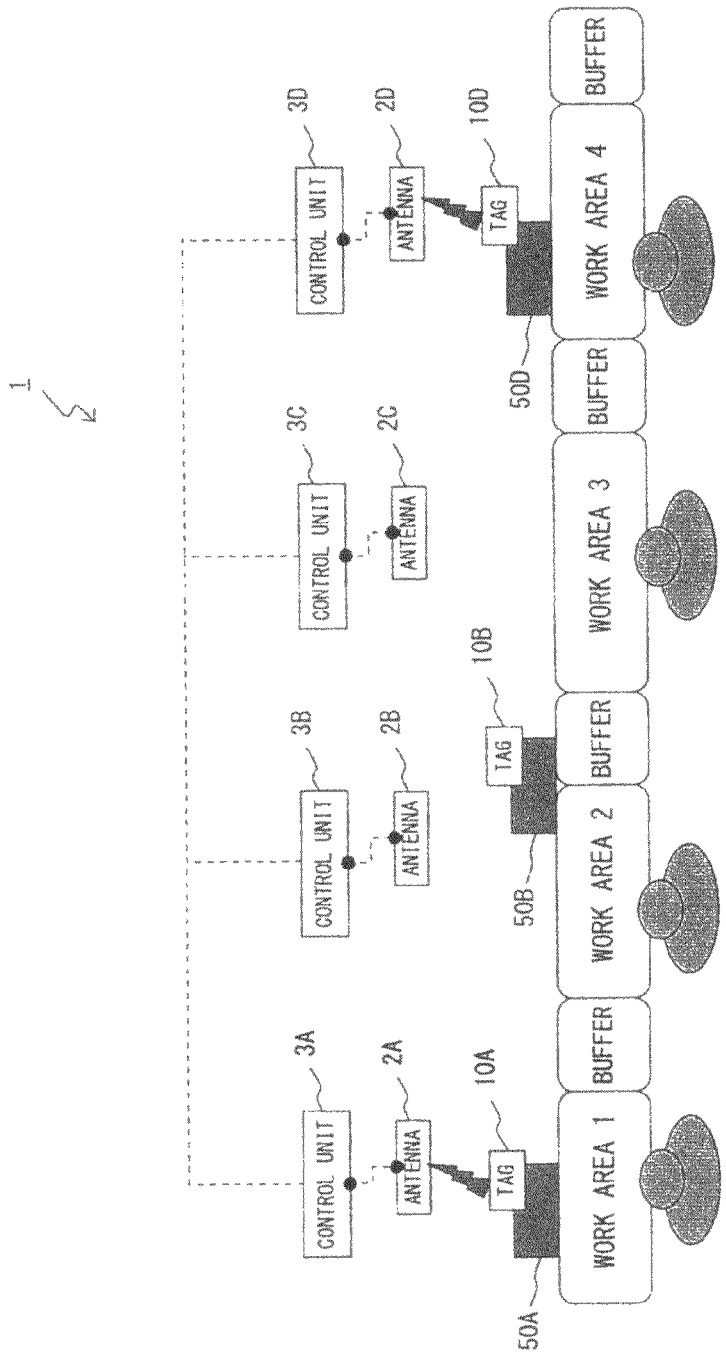
FIG. 7 shows the conceptual diagram of the RFID system of the present embodiment.

FIG. 7 shows the concept of the RFID system of the present embodiment. As shown in FIG. 7, the RFID system is applied, for example, to a production line and comprises an RFID tag 10 attached to a product 50 and a control system 1.

The production line is provided with a plurality of work areas according to its process and a buffer area between work areas. In each work area a worker does work predetermined for each process, such as the assembly, packing and the like of the product 50.

The RFID system 1 comprises an antenna 2 and a control unit 3, and is installed in every work place which requires communications with the RFID tag 10 along the production line. For example, in the system configuration example shown in FIG. 7, the RFID system 10 is installed in each of work areas 1 to 4. The antenna and control unit which are installed in work area 1 are described as antenna 2A and control unit 3A, respectively. Similarly, antennas in work areas 2, 3 and 4 are described as 2B, 2C and 2D, respectively, and control units in work areas 2, 3 and 4 are described as 3B, 3C and 3D, respectively.

Alternatively, the RFID system 1, which is omitted in the system configuration example shown in FIG. 7 can be installed in a buffer area. If it is necessary to write into the RFID tag 10 or the like when the product 50 exists in the buffer area, that is, work is mot applied to the product 50 in the production line, the RFID system is installed in the buffer area.

In the RFID system 1 shown in FIG. 7, when the antenna 2 in the RFID system 1 detects a electro-magnetic wave transmitted by the RFID tag 10, each control unit 3 performs a process according to information stored in the RFID tag 10 and writes its execution result into the RFID tag 10.

Figure 8:
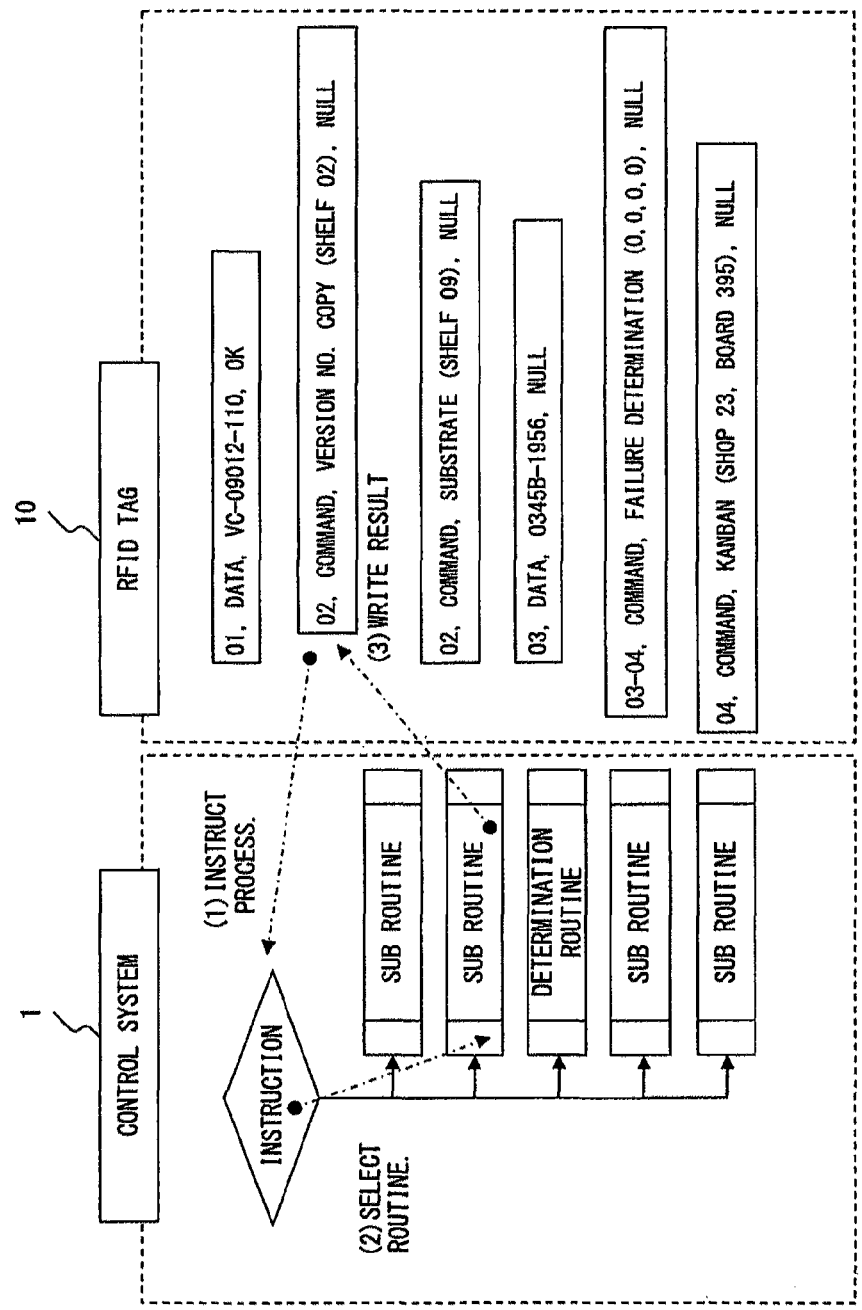
FIG. 8 shows the processing method of the RFID system of the present embodiment.

FIG. 8 shows the processing method of the RFID system of the present embodiment. Firstly, (1) when the antenna 2 detects the RFID tag 10 in a specific work area or a test area, the RFID system 1 reads a process to be instructed to perform by the RFID tag 10. Then, (2) the RFID system 1 selects a subroutine to be executed according to the instructed contents and executes the selected subroutine. Lastly, (3) the RFID system 1 writes the result of the executed subroutine into the RFID tag 10.

In this way, the control unit 3 of the RFID system in the present embodiment determines and executes a subroutine to be executed of sub routines held by the control unit 3 itself, according to a batch process routine stored in the RFID tag 10.

Figure 9A:
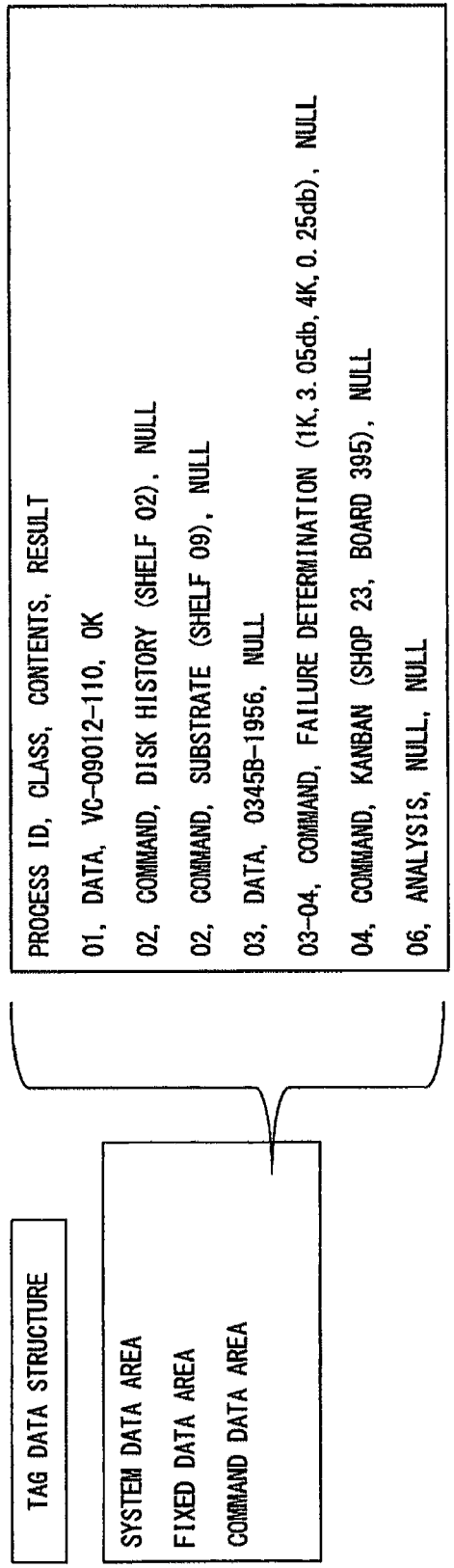
FIG. 9A shows the data structure of the RFID tag and the data transmitting/receiving method between the RFID tag and the control unit (No. 1).
Figure 9B:
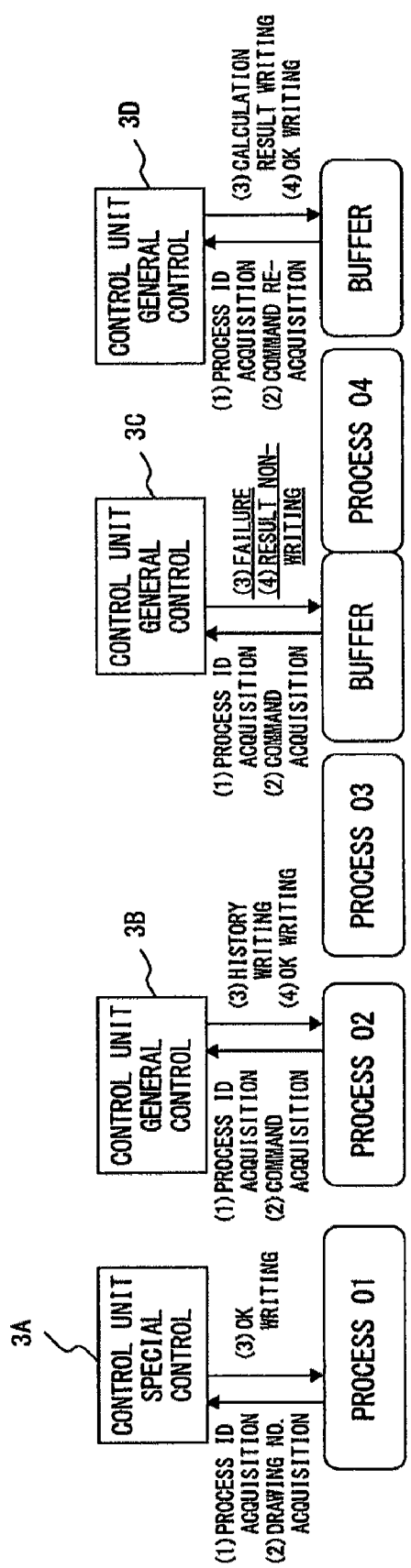
FIG. 9B shows the data structure of the RFID tag and the data transmitting/receiving method between the RFID tag and the control unit (No. 2).

FIGS. 9A and 9B show the data structure of the RFID tag 10 and the data transmitting/receiving method between the RFID tag 10 and the control unit 3. FIG. 9A shows an example of the data structure of the RFID tag 10 in the present embodiment.

As shown in FIG. 9A, the memory of the RFID tag 10 comprises a system data area, a fixed data area and a command data area. Of these data areas, the system data area stores information about the product 50, and stores the identification information of the maker of the product 50, the RFID tag 10 attached to it and the like. The fixed data area stores data used in the RFID system. These system and fixed data areas are also provided for the conventional RFID tag.

The command data area stores information which relates to processes to be performed in the control unit 3, specifically data class information, data and result information in relation to process identification information. In the present embodiment batch process routines are stored in the command data area.

The process identification information indicates the timing of applying a process to the RFID tag, specifically where on the production line the product 50, that is, the RFID tag 10 exists. The data class information indicates information for determining, in the control unit 3, whether data described on the line indicates a command to be executed against the control unit 3 or parameter data used in the control unit 3. The data is data to be processed in the control unit 3 and is composed of command data or parameter data. The command data is stored together with parameter data according to process contents. The result information is composed of process results in the control unit 3.

In FIG. 9A there are two lines to which "02" is set as process identification information. Specifically, there are two processes to be performed in a "process 02" in the command data area. In this case, for example, by specifying that the control unit 3 sequentially reads the command data area from the top and performs processes in the reading order, firstly, the copy command of disk history is executed and then the copy command of substrate information is executed.

Of the description examples of the command data area shown in FIG. 9A, there are lines to which "03-04" is set as process identification information. They indicate that the failure determination command of these lines should be executed in a buffer between the processes 03 and 04.

FIG. 9B shows the procedures of transmitting/receiving data between the control unit 3 and the RFID tag 10. The numbers (1) to (4) shown in FIG. 9B indicate the procedures of transmitting/receiving data between each of the control units 3 and the RFID tag 10. The description of the product 50 to which the RFID tag 10 is attached is omitted in FIG. 9B.

For example, in process "01", firstly, (1) the control unit 3A obtains process identification information from the command data area of the RFID tag 10. As shown in FIG. 9A, the data class of process "01" is "data". Therefore, (2) the control unit 3A obtains "VC-0902-110", parameter data. Lastly, (3) the control unit 3A writes "OK" being information indicating a process is normally completed into result information in the line of process identification information "01" of the command data area of the RFID tag 10 and terminates the process in the control unit 3A. In the other control units 3B, 3C and 3D, similarly, when the antenna 2 under each control unit detects the RFID tag 10, the command and parameter of its own process is read from the command data area, the process is performed and a value is set to the RFID tag 10 according to the execution result.

According to the RFID tag 10 configured as shown in FIG. 9A, the control unit 3 has only a subroutine of the control program and the RFID tag 10 has the batch process routine. By such a data structure of the RFID tag 10, as shown in FIG. 9B, when the antenna 2 detects the RFID tag 10, various control processes of the control unit 3 are performed on the basis of the batch process routine stored in the command data area of the RFID tag 10, thereby executing a control program matched to the movement of the RFID tag 10.

The data stored in the command data area has information about the process result of each batch. Therefore, by referring to the result information, the control unit 3 can determine whether each batch is already executed or not, thereby enabling to perform the sequence control.

Figure 10:
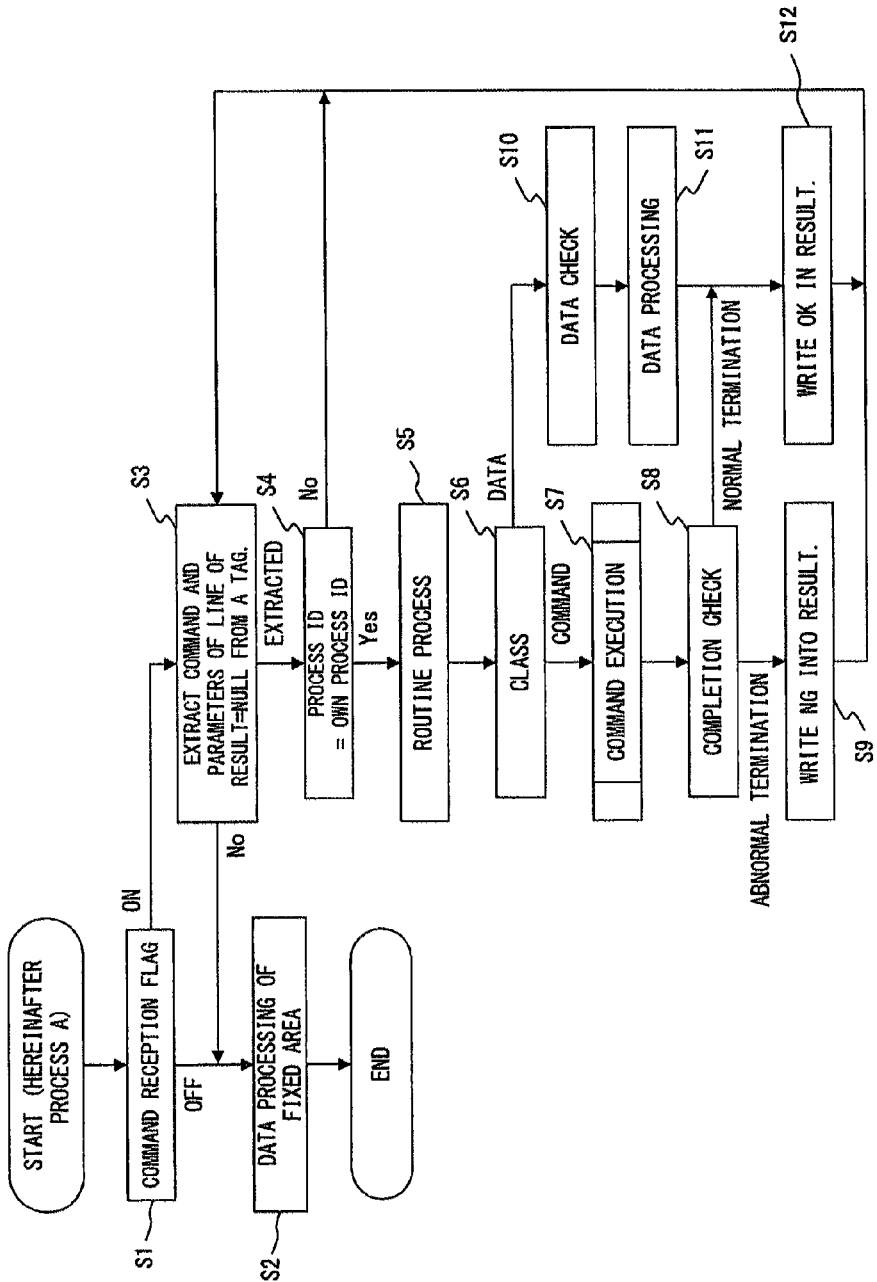
FIG. 10 is a flowchart showing the basic operation of the RFID system of the present embodiment.

FIG. 10 is a flowchart showing the basic operation in the control unit 3 of the RFID system of the present embodiment. The process shown in FIG. 10 is started using the recognition of the RFID tag 10 in the control unit 3 via the antenna 2 connected to each control unit as a trigger.

Firstly, in step S1, the value of a command reception flag is referenced. The command reception flag is held by the control unit 3. The control unit 3 refers to this flag value and determines whether a process should be performed referring to the batch process routine of the command area data in its own process.

If the command reception flag is set off, the flow proceeds to step S2. In step S2, the process is performed by referring only to information stored in the fixed data area without referring to the command data area of the RFID tag 10.

If the command reception flag is set on, the flow proceeds to step S3. In step S3, of the batch process routines of the command data area, only lines in which a value Null is set to the result information are extracted. If no line in which the value Null is set is extracted, the flow proceeds to step S2 and the process is executed using the information stored in the fixed data area.

If in step S3 the line in which the value Null is set is extracted, the flow proceeds to step S4. In step S4, the value of the process identification information (process ID) of the extracted line is referenced. If it coincides with the number of its own process, in step S5 the routine processing of the process is performed and in step S6 the data class information of the command data area is referenced.

If a "command" is set when the data class information is referenced in step S6, the flow proceeds to step S7. In step S7, the control unit 3 reads command data stored in "data" of the command data area and executes the command. Then, in step S8, the process result is checked. In the case of abnormal termination, in step S9 "NG" is written into the RFID tag 10 as the result information and the flow returns to step S3. In the case of normal termination, in step S12 "OK" is written into the RFID tag 10 as the result information and the flow returns to step S3.

If "data" is set as data class when the data class information is referenced in step S6, the flow proceeds to step S10. In step S10, parameter data stored in "data" on the extracted line of the command data area of the RFID tag 10 is obtained and its value is checked. Then, after a prescribed process is performed using the parameter data obtained in step S1, the flow proceeds to step S12. In step S12, "OK" is written as the result information and the flow returns to step S3.

The detailed processing method of each process in the case where the RFID system of the present embodiment is introduced into a production line is described below.

Figure 11:
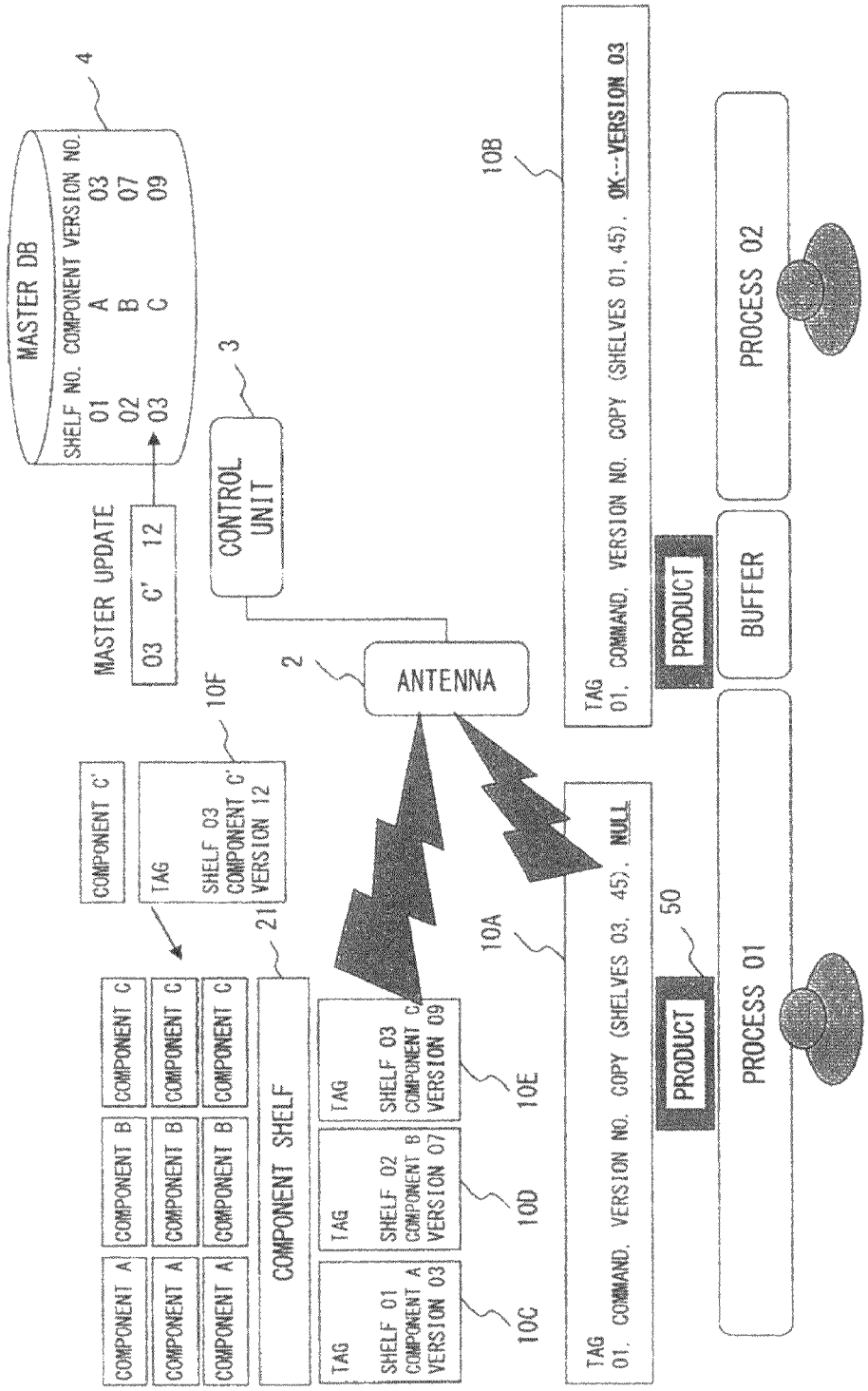
FIG. 11 shows a method for managing history using the RFID system of the present embodiment.

FIG. 11 shows a method for managing history using the RFID system of the present embodiment. Various components A, B and C sequentially carried from outside, such as a storage area or the like, is filled in the prescribed position of each component shelf 21 of the process "01". A component box or the like is located in the position of each of the components A, B and C and an RFID tag is attached to each box. Each of RFID tags 10C, 10D and 10E attached to the boxes stores shelf information indicating its position on the component shelf 21, component information indicating the component held in the box and version information indicating a version of the component held in the box.

After the filling of a component into the box is completed, the component is carried away from the prescribed position of the component shelf 21 to outside and a subsequent component box to be filled is disposed in the position where the component box that has been carried out to outside. In the example shown in FIG. 11, component C is filled into the previously disposed component box. After the filling of component C into a component box is completed, the component box is carried out to outside and another component box for newly filling component C' is disposed in that place.

In this way, when a component box is sequentially disposed on the component shelf 21 and a prescribed component is filled in a production line, the kind of a component to be filled in the former component box and that of a component to be filled in the latter component box are not always the same. The relationship between a place where a component box is disposed on the component shelf 21 (position information) and a component to be filled into a component box disposed in that place is managed by the master database 4 of the RFID system 1. In that case, a component and its version information are also related and its information is stored. When a component box is carried out to outside and a new component box is placed in that place, the data in the master database 4 is updated on the basis of the data of a RFID tag 10 attached to a new component box.

In the production line, work is applied to a product 50 (components A, B and C and the like in this case). When the product 50 is carried on the work line, its history is sequentially recorded on the RFID tag 10 of the product 50 passing through the neighborhood of the antenna 2.

In the RFID system 1 of this preferred embodiment, if the RFID tag 10 detected by the antenna 2 is an RFID tag 10 attached to a component box, information stored in the RFID tag is reflected in the master database 4. If the detected RFID tag 10 is an RFID tag 10 attached to the product 50, information in its command area is read and its version number is copied.

Figure 12:
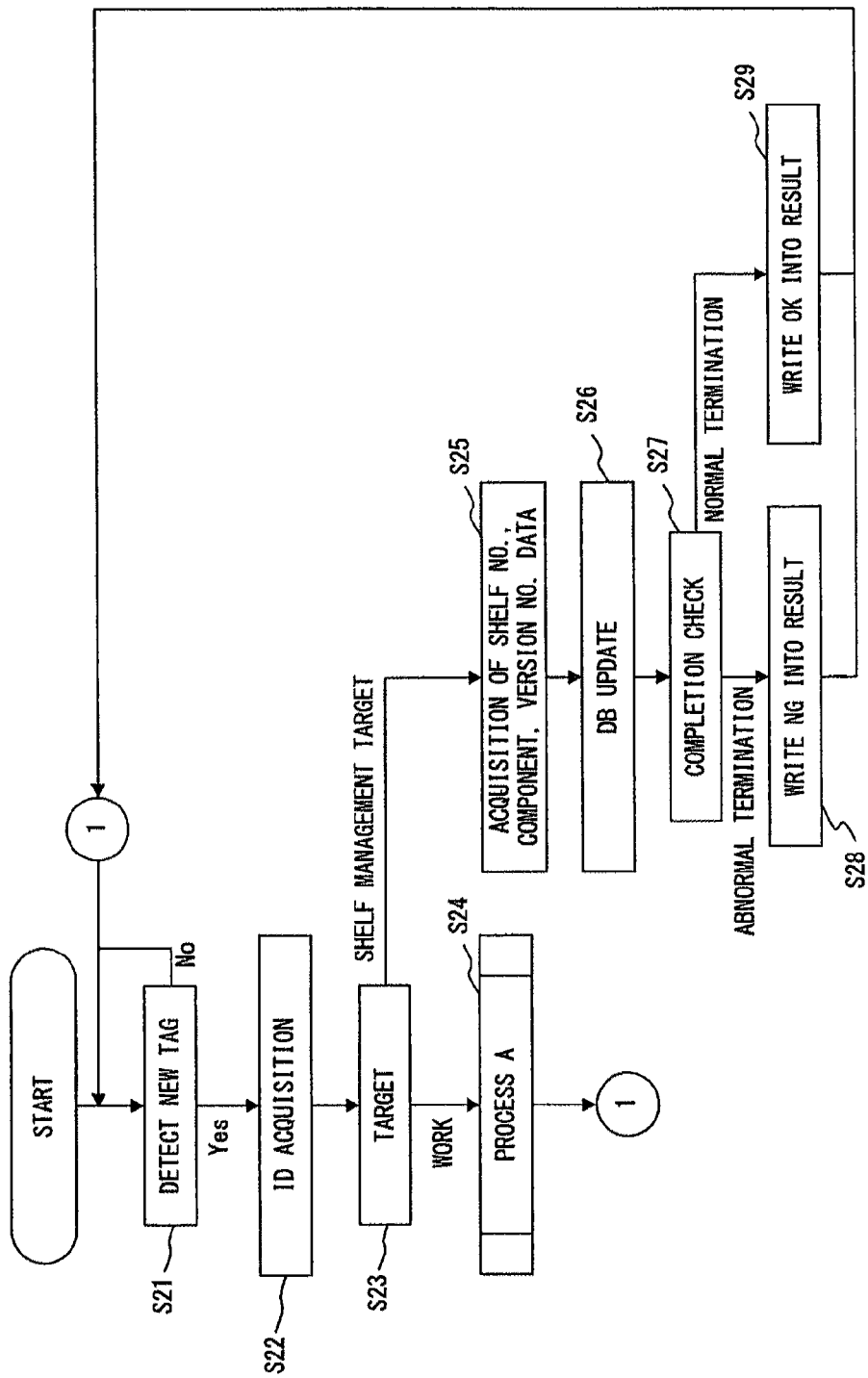
FIG. 12 is a flowchart showing the history management process in the RFID system.

FIG. 12 is a flowchart showing the history management process in the control unit 3 of the RFID system 1.

Firstly, in step S21 an RFID tag 10 is awaited. When a new RFID tag 10 is detected, the flow proceeds to step S22 and its identification information is obtained from the system data of the detected RFID tag 10. Then, in step S23 it is determined to which the detected RFID tag 10 is attached, the product 50 on work line or a component box on the component shelf 21.

If it is attached to the product 50, it is considered to be the target of the version number copy process and the flow proceeds to step S24. After the version number copy process is performed, the flow returns to step S21 for waiting for a new RFID tag. In this case, the version number copy process in step S24 corresponds to the basic operation shown in FIG. 10 and a line describing a "version number copy process", of the batch process routine described in the command area of the RFID tag 10 is extracted and executed in step S3 of FIG. 10. The details of the version number copy process are described later.

If the RFID tag 10 is attached to the component box, the flow proceeds to step S25 and its shelf position information, component information and version number information are extracted from the RFID tag 10. Then, in step S26 the extracted data is reflected to the master database 4. In step S27 the update result of the master database 4 is checked. If the update of the master database 4 is abnormally terminated, in step S28 "NG" is written into the result information of the command area of the RFID tag 10 and the flow returns to step S21. If the update of the master database 4 is normally terminated, the flow proceeds to step S29. In step S29 "OK" is written as result information and the flow returns to step S21.

Figure 13:
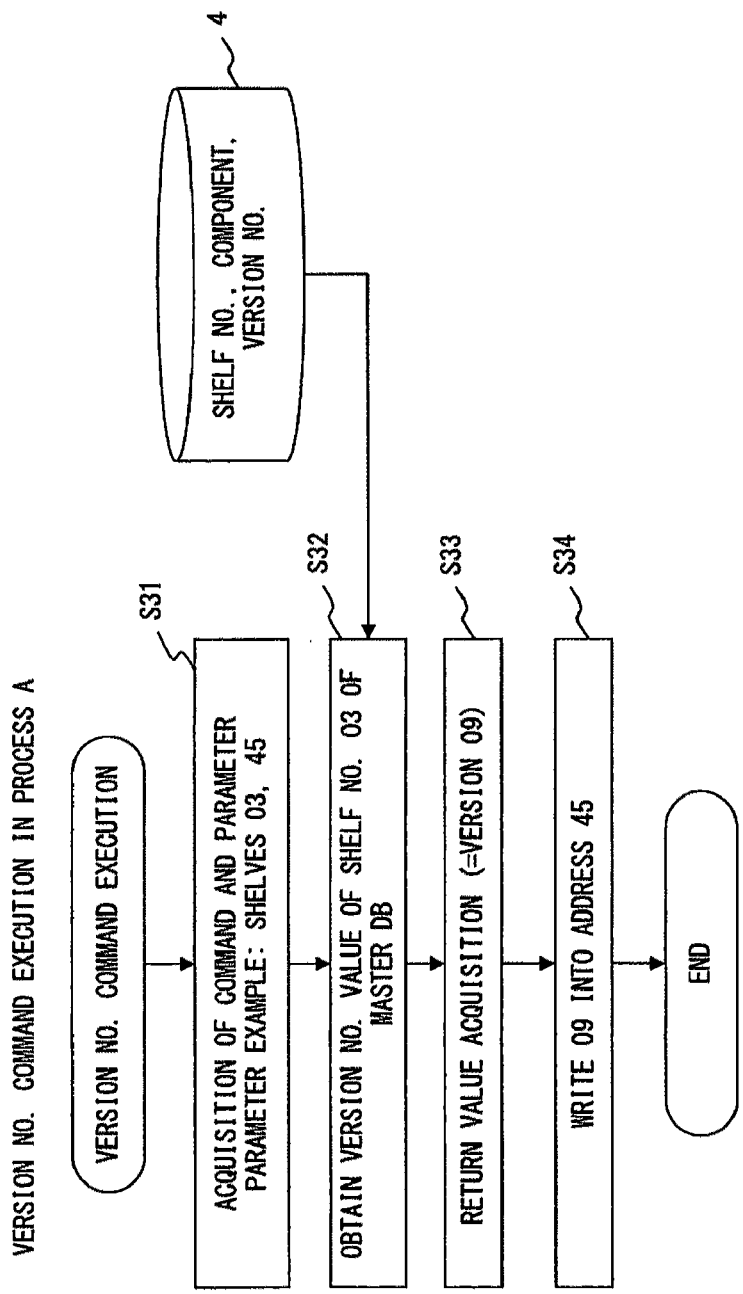
FIG. 13 is a flowchart showing the version number copy process.

FIG. 13 is a flowchart showing the version number copy process. In FIG. 13, only the command execution part in step S7, of a series of processes shown in FIG. 10 is described and the descriptions of preprocessing, such as the determination of a command reception flag value, the extraction of a version number copy batch, a routine process and the like are omitted.

In step S31, a version number copy command and its parameter data are obtained from the command area of the RFID tag 10. In the example shown in FIG. 11, a command extracted from the RFID tag 10 is "version number copy" and parameter data to be extracted is shelf position information "03" and address information "45". In this case, the address information is the memory address of the RFID tag 10, and as to the version number copy, it is the address of the copy destination of the obtained version number information.

In step S32, search of the master database 4 is executed using the shelf position information as a key to obtain the version number information. In step S33, the control unit 3 obtains a value "09 version" as the return value of the version number copy command. In step S34, version number information "09" is written into the number of address 45 of the RFID tag 10 and the version number copy process is terminated.

As described above, according to the history management method using the RFID system of the present embodiment, it is determined to which the detected RFID tag 10 is attached, a component box or the product 50. If the RFID tag 10 is attached to a component box, data is read from the RFID tag 10 and the master database 4 is updated. If it is attached to the product 50, a batch describing a version number copy command is read from the command data area and the version number information of the master database 4 is copied to the RFID tag 10.

As described above, a manual operation by a manager or the like is not needed to update the master database 4. When a component box on the component shelf 21 is replaced and the RFID tag 10 of a new component box is detected in the RFID system 1, the data of the RFID tag 10 is automatically reflected to the master database 4. In this case, by using the detection of the RFID tag 10 on a component box as the trigger of the update of the master database 4, there is no need to relate a program for updating the master database 4 to the history management program. Thereby it can prevent the program of the RFID system 1 from getting larger and also prevent mismatch between version number information to be written into the product 50 and the version number information of the master database 4 from occurring.

Figure 14:
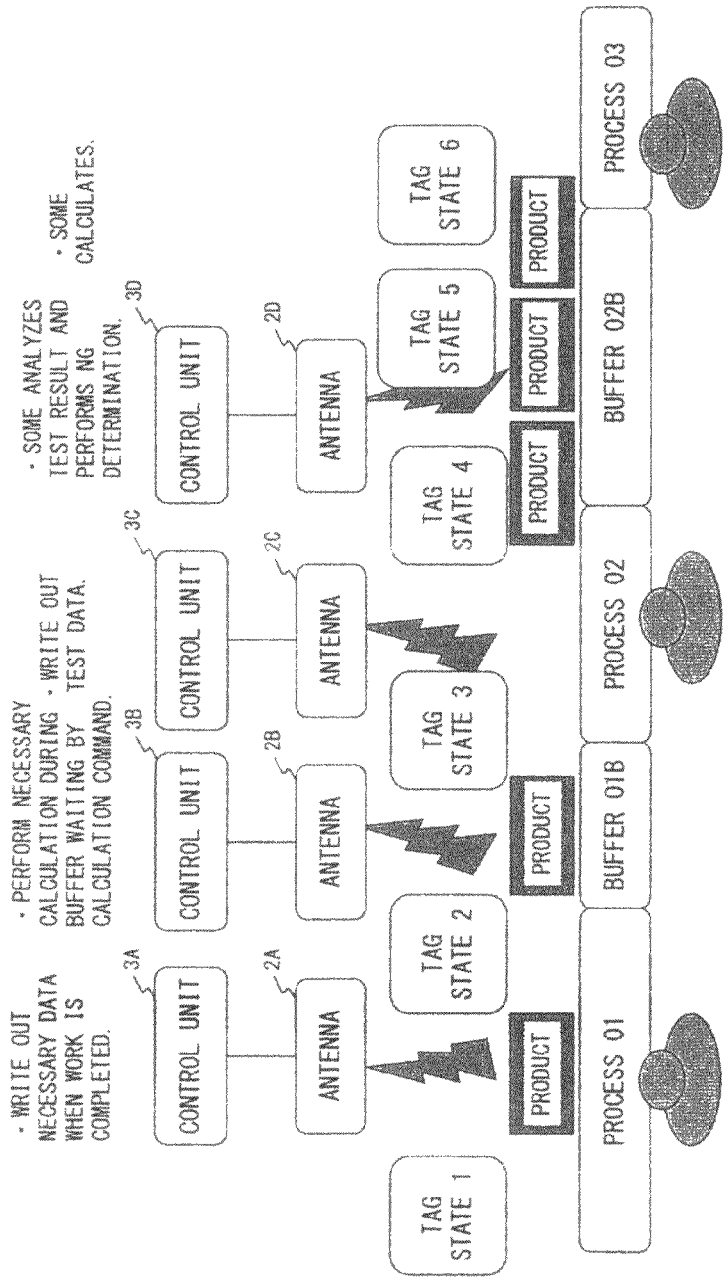
FIG. 14 shows a method for testing a product using the RFID system of the present embodiment.

FIG. 14 shows a method for testing the product 50 using the RFID system of the present embodiment. The system configuration example shown in FIG. 14 comprises the control unit 3 and the antenna 2 in each area of a process 01, a buffer 01B, a process 02 and a buffer 02B. The control units 3 and antennas 2 installed in each area are distinguished as control units 3A, 3B, 3C and 3D and antennas 2A, 2B, 2C and 2D, respectively, by attaching alphabetical symbols.

In each process, each predetermined work, such as the assembly of the product 50 or the like, is implemented. Simultaneously, when the product 50 passes through the tag detection area of the antenna 2 on the work line, the RFID system 1 performs the test of the product 50, calculation necessary for the test, the analysis of the test result and the like.

FIG. 15 shows the state of the command data area of the RFID tag 10 in each stage in the case where the product 50 is tested in the system configuration shown in FIG. 14. The tag batch process routine shown in FIG. 15 describes only lines relating to a test. Each of the control units 3A, 3B, 3C and 3D performs a process according to the batch described in the command data area of the RFID tag 10 and writes the process result in the RFID tag 10.

The test execution method by the RFID system 1 of the present embodiment is described below with reference to FIGS. 14 and 15.

Firstly, if the antenna 2 detects an RFID tag 10 when the product 50 is in process 01, the control unit 3A conducts a threshold management test necessary for a function test conducted later and writes threshold data into the RFID tag 10. In this case, the threshold management test and the writing of its result is performed, for example, after the prescribed work against the product 50 of the process is completed, according to the contents of work in process 01. If its timing is appropriate, it can be conducted before the work or during the work.

States 1 and 2 shown in FIG. 15 are the states of the command data area before and after conducting the threshold management test, respectively. When the control unit 3A executes a quality analysis command, thresholds necessary for the test (3 µF, 0.05V and 980 Å) can be obtained and are set as the parameter data of the quality analysis command of process identification information "01-01B". In this case, the process identification information "01-01B" indicates that it is a batch to be processed between process 01 and buffer 01B after process 01. As its result information, "CHK" indicating being during the quality analysis process is stored.

If the antenna 2B detects an RFID tag 10 when the product 50 is in buffer 01B after process 01, the control unit 3B conducts a quality analysis test using the obtained thresholds and writes its result into the RFID tag 10.

State 3 shown in FIG. 15 is a state after conducting the quality analysis test. "93 dB" is obtained by the quality analysis test and is set as the parameter data of the quality analysis command. The location of the obtained value is the memory address "50" according to the value previously handed as parameter data. "OK" indicating the completion of the quality analysis process is set as its result information.

If the antenna 2C detects an RFID tag 10 when the product 50 is in process 02, the control unit 3C downloads a necessary test program, conducts a function test using the value obtained as the result of the quality analysis test and writes its test result into the RFID tag 10. As to the timing of the function test in process 02, as in the case of process 01, it is conducted in an appropriate timing, such as before work, after work, during work or the like, according to the contents of work done by a worker or the like in the process.

State 4 shown in FIG. 15 is a state after conducting the function test. "NG" indicating the failure of the test is stored in the parameter of the test command of process identification information "02". Since the test program has been normally executed and normally terminated although the test has failed, "OK" is set as its result information.

If the antenna 2D detects an RFID tag 10 when the product 50 is in buffer 02B after process 02, the control unit 3D determines the test result in the previous process 02. For example, as to a product 50 whose test result in process 02 is "NG", the control unit 3D reads the result of the function test to verify the test result and issues an alarm, stops its carrying to a subsequent process or so on. As to a product 50 whose test result in process 02 is "OK", in the example shown in FIG. 14, it is carried to a subsequent process without performing a particular process.

State 5 shown in FIG. 15 is a state after performing the analysis of the test result in buffer 02B of the product whose test result is NG. In this case, "90 dB" is set as the process result of the quality analysis command previously executed in process 01 and buffer 01B. Since as described above, the quality analysis result is over 93 dB and the test result is OK, of the products on the process 02 line, the second product is determined to be a defective.

State 6 shown in FIG. 15 is the state of the RFID tag 10 of a product 50 whose test result is OK. In this case, "120 dB" is stored as the process result of the quality analysis command. Since it is larger than 93 dB being a threshold for determining whether the product is good/bad, the product is carried to a subsequent process 03 without performing a particular process.

FIGS. 16 to 18B are flowcharts showing the test process in the control unit 3 of the RFID system 1.

Figure 16:
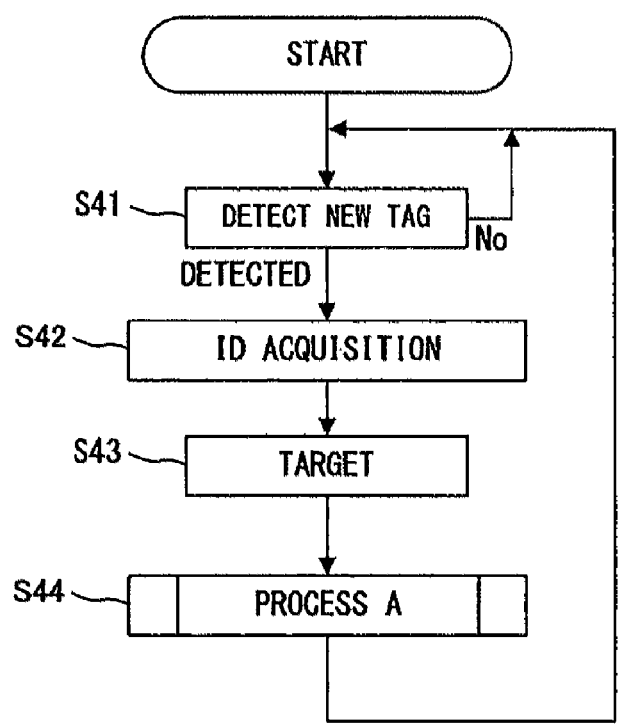
FIG. 16 is a flowchart showing the test process in the RFID system (No. 1).

The processes in steps S41 through S44 of FIG. 16 correspond to those in steps S21 through S24 of FIG. 12, respectively. However, the detected RFID tag 10 all are test targets in the flowchart shown in FIG. 16, and a different process is not performed depending on a detected RFID tag 10 unlike steps S23 of FIG. 12.

In step S44, as described with reference to FIG. 14, a different process is performed depending on the installation place of the control unit 3.

FIGS. 17A, 17B, 18A and 18B are flowcharts showing the processes performed by each of the control units. Each of FIGS. 17A, 17B, 18A and 18B shows the detailed process A in step S44 of FIG. 16, performed by each control unit 3. The process performed in each of the control units 3A, 3B, 3C and 3D shown in FIG. 14 is described in detail with reference to FIGS. 17A, 17B, 18A and 18B.

FIG. 17A is a flowchart showing the function test process of the control unit 3A.

In step S51 a command "quality analysis" and parameter data "0, 0, 0, 50" is obtained from the line of process identification information "01-01B" of the RFID tag 10. In step S52 a function test process is performed using the obtained parameter data in order to obtain thresholds to be used for the quality analysis test indicated by the obtained command. In step S53, when receiving return values "3 μF, 0, 0.5V, 980 Å, 50" as the result of the function test, in step S54 the obtained return values are written into the parameter data on a corresponding line of the RFID tag 10 and the process is terminated.

Figure 17B:
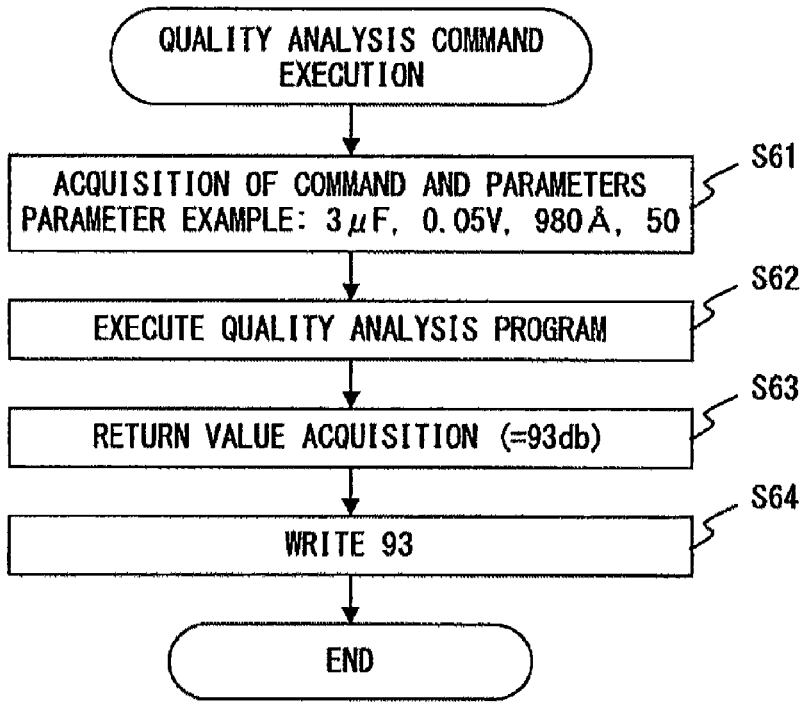
FIG. 17B is a flowchart showing the test process in the RFID system (No. 3).

FIG. 17B is a flowchart showing the quality analysis process of the control unit 3B.

In step S61 a command "quality analysis" and parameter data "3 μF, 0, 0.5V, 980 Å, 50" is obtained from the line of process identification information "01-01B" of the RFID tag 10. In step S62 a quality analysis program is executed using the obtained parameter data as indicated by the obtained command. In step S63, when receiving a return value "93 dB" as the result of executing the quality analysis program, in step S64 the obtained return value is written into the parameter data on a corresponding line of the RFID tag 10 and the process is terminated.

Figure 18A:
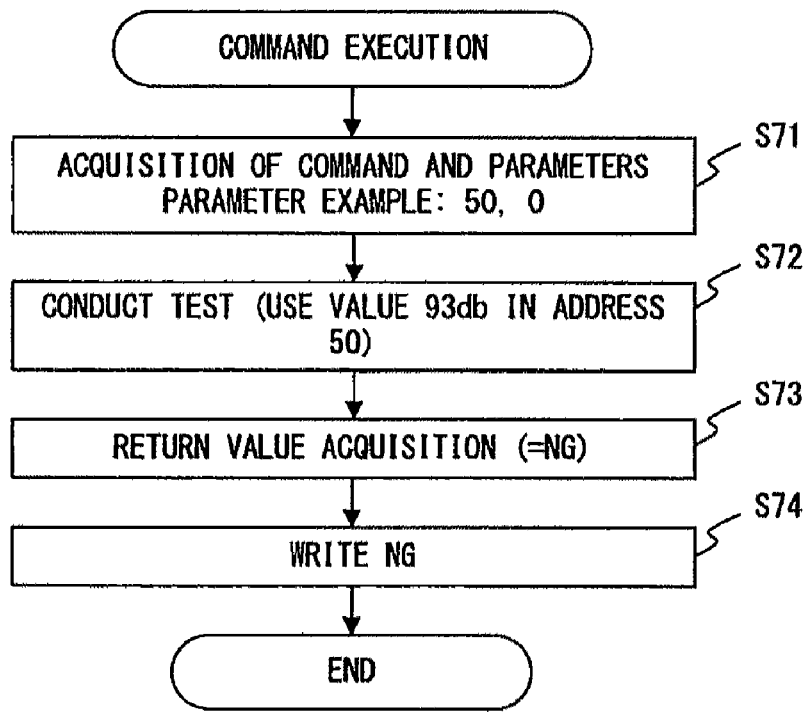
FIG. 18A is a flowchart showing the test process in the RFID system (No. 4).

FIG. 18A is a flowchart showing the test program execution process of the control unit 3C.

In step S71 a command "test" and parameter data "50, 0" is obtained from the line of process identification information "02" of the RFID tag 10. In step S72 a test program is executed using the obtained parameter data and a value "93 dB" stored in the "address 50" of the memory. In step S73, when receiving a return value "NG" as the result of executing the test program, in step S74 the obtained return value is written into the parameter data on a corresponding line of the RFID tag 10 and the process is terminated.

Figure 18B:
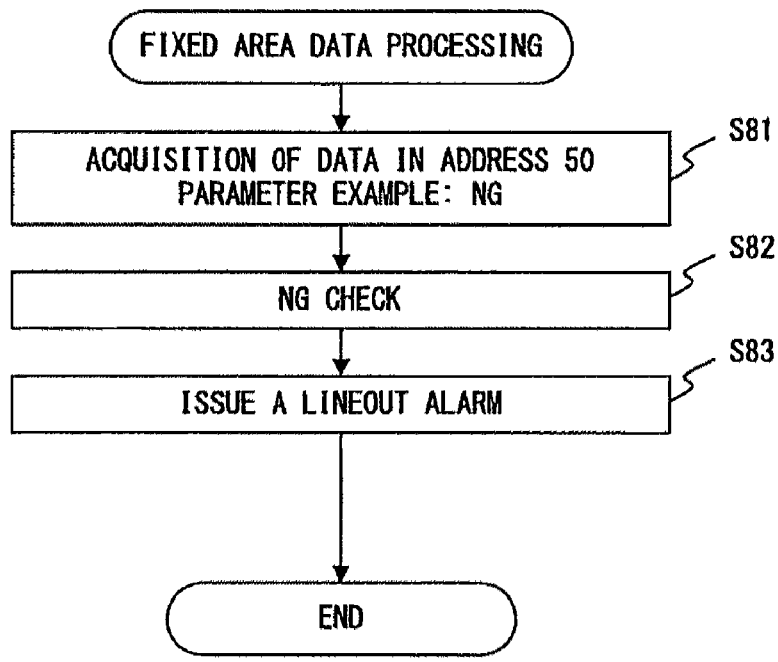
FIG. 18B is a flowchart showing the test process in the RFID system (No. 5).

FIG. 18B is a flowchart showing the data processing of the control unit 3D.

In step S81 the data stored in the address 50 of the memory is referenced. In step S82 it is determined whether the test result conducted in buffer 02B is "NG" or not. If the test result is NG, in step S83, a line-out alarm is outputted and the process is terminated.

As described above, each control unit 3 extracts a line describing a command to be executed in its own process or parameter data to be obtained from the command data area of the detected RFID tag 10 and performs a process according to the contents described on the line. Even when, for example, a plurality of kinds of products is placed on a production line, the RFID tag 10 has a command and parameter data corresponding to each product. Therefore, a process corresponding to the kind of a product, that is, work can be performed.

In this case, in advance the antenna 2 and control unit 3 are provided in a plurality of places on the line and a process to be executed by each control unit 3 is described in the command data area. Each control unit 3 performs a process corresponding to a command read from the command data area using values set as parameters.

The calculation process of thresholds necessary for a test, a quality analysis process are sequentially performed and the parameter values described in the command data area can be used for necessary data. For example, in the quality analysis process, the control unit 3 transfers the obtained parameters (3 μF, 0.05V, 980 Å, 50) to a quality analysis program, obtains return values and sets them as the parameters of the command data area. Although conventionally threshold calculation and quality analysis must be performed during the work of a process, such a quality analysis program can be executed in a buffer area by making the RFID tag 10 have necessary data.

As to the test, the test program of the product 50 is taken in an actual machine and is independently conducted. Conventionally, when it is necessary to use the quality analysis result in the test program, it is necessary to access the quality analysis program and to obtain the quality analysis result in the test program. However, according to the test method of the present embodiment, since necessary data is already set in the RFID tag 10, it is sufficient only to read data from the command data area of the RFID tag 10 when executing the test program. Thus, the size of the test program can be suppressed and also time necessary for the test can be shortened.

Furthermore, since its test result is stored in each of the RFID tags 10 attached to the products 50 on the line, a defective product can be prevented from flowing into a post-process by analyzing the test result in a buffer before the product 50 is carried into a subsequent process after the completion of the test, and by specifying a product whose test result is NG and removing it from the line, stopping the line and so on.

Figure 19:
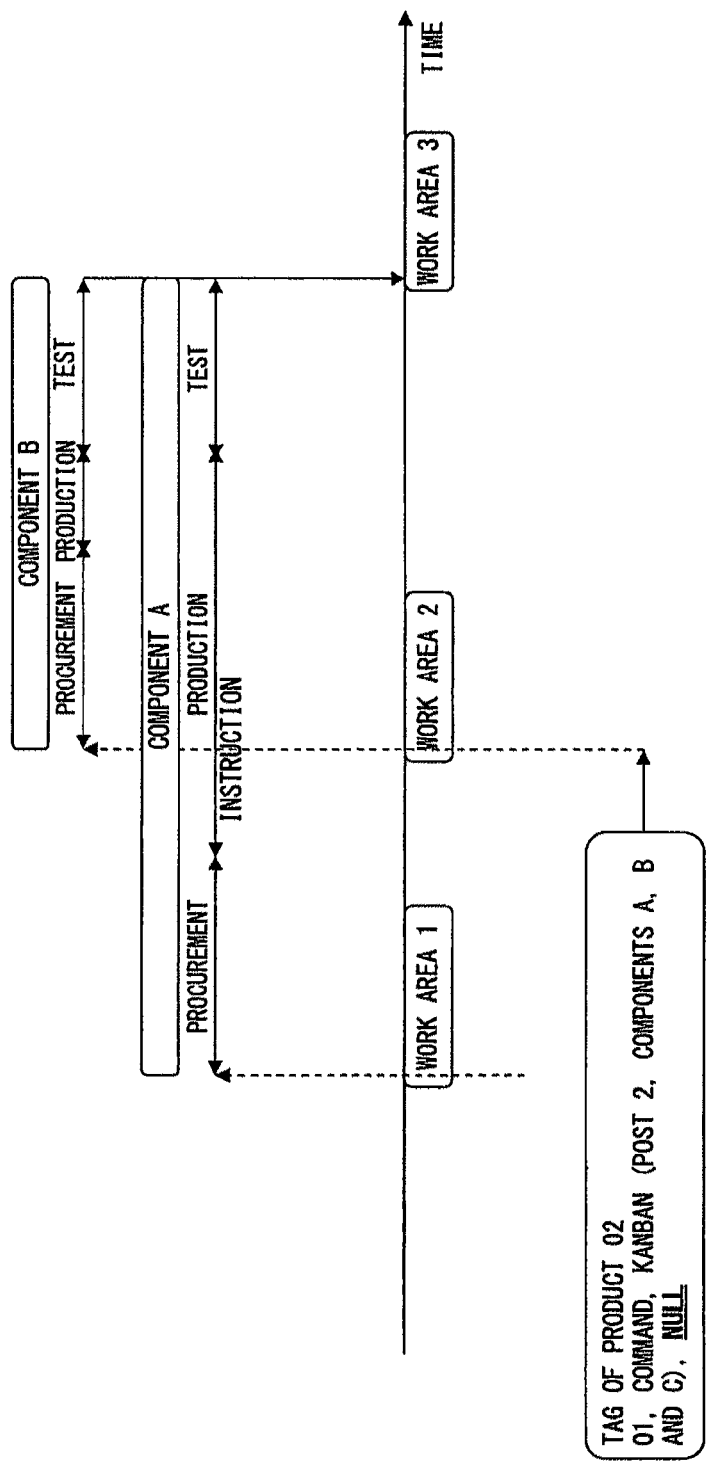
FIG. 19 shows a method for issuing a JIT instruction using the RFID system of the present embodiment.

FIG. 19 shows a method for issuing a JIT (just-in-time) instruction using the RFID system 1 of the present embodiment. For example, in work area 3, the product 50 is assembled. It is assumed that at this time, although component A is used for a certain product (product A), component B is used for another product (product B). As to component A, it is assumed that in order to use it in work area 3, kanban must be issued when component A is located in work area 1. Whereas as to component B, it is assumed that in order to use it in work area 3, kanban must be issued when component B is located in work area 2.

At this time, for example, shown in FIG. 19, "01" indicating process identification information in work area 2, "command", "kanban issue command" "POST2, components A, B and C" and a Null value are set in the command data area of the RFID tag 10 attached to product B, its data type, its command contents, its command parameter and its result information, respectively.

As shown in the RFID tag 10 example of product B, when the antenna 2 installed in each of processes and buffers detects the RFID tag 10, the RFID system 1 refers to the data of the command data area and issues a kanban according to its parameter data if a kanban issue command to be executed in its own process is described.

Figure 20:
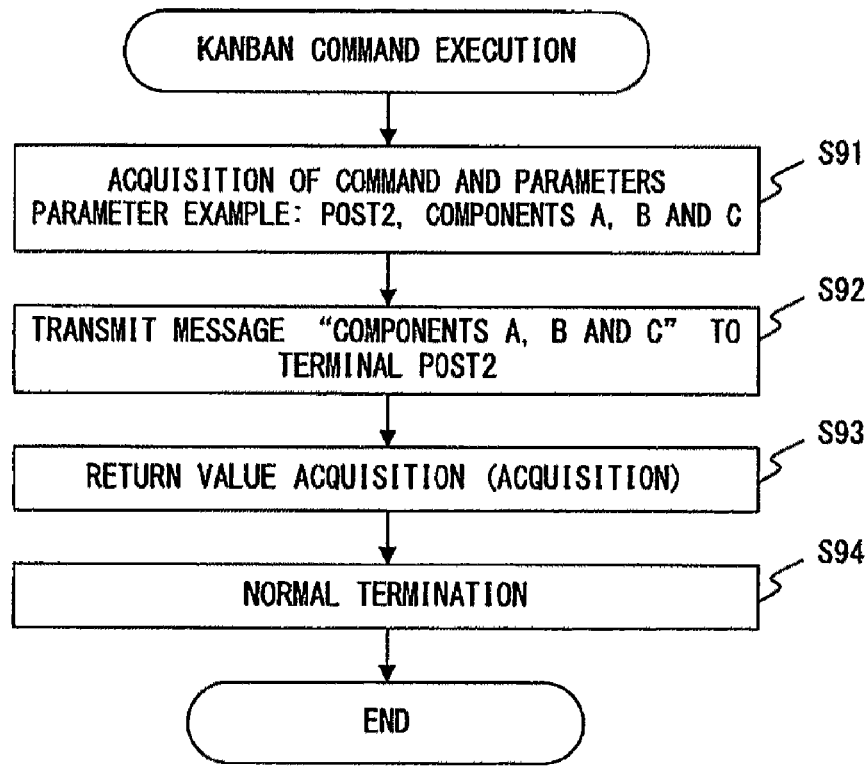
FIG. 20 is a flowchart showing the kanban issuance process in the RFID system.

FIG. 20 is a flowchart showing the kanban issuance process in the control unit 3 of the RFID system 1. In this case, as the preprocessing of the process shown in FIG. 20, the process shown in FIG. 16 is already performed, the system data of a newly detected RFID tag 10 is checked and a prescribed process A, in this case kanban issuance process, is applied to the RFID tag 10 determined to be a control target.

In step S91 the control unit 3 obtains a command and parameter data from the command data area of the RFID tag 10. The command to be obtained here is "kanban" and the parameter data is "POST2, components A, B, C" shown in FIG. 20. The parameter data is composed of kanban issuance destination information and component information. Although in this example, a terminal name is set as the kanban issuance destination information, the kanban issuance destination information is not limited to this. It can be also a network name, an IP address, a port name or the like. The component information indicates a component to be procured.

In step S92 message "components A, B and C" is transmitted to the address indicated by the kanban issuance destination information, in the above-described example, a terminal POST2 on the basis of data obtained from the RFID tag 10. In step S93 return values indicating that the kanban has issued are obtained. In step S94 a value indicating normal termination is stored in the result information in the command data area of the RFID tag 10 and the process is terminated.

As described above, by storing kanban issuance destination and information about necessary components in the RFID tag 10, when the antenna 2 in a work area where kanban issuance process is to be performed detects the product 50 to which the RFID tag 10 is attached, the control unit 3 connected to the antenna 2 reads the data of the command data area and issues a kanban. Therefore, there is no need to manage the timing of kanban issuance for each product on the RFID system 1 side, and by describing the timing of the kanban issuance, that is, a process in the command data area in advance, a kanban can be issued in an optimal timing.

As described above, according to the RFID system of the present embodiment, when an RFID tag is recognized in each process, a process to be performed in the process can be performed in an appropriate timing on the basis of information stored in the command data area of the RFID tag. Since data necessary for each process can be also stored in the command data area, time necessary for a process can be also shortened.

What is claimed is:

1. An RFID system provided with a plurality of processes, the system comprising:
    an antenna unit to detect a electro-magnetic wave transmitted by an RFID tag and read and write to a storage area of the RFID tag, the storage area including a first area to store ID information and a second area to store process identification information and command information corresponding to the process identification information; and
    a control unit including,
        a determination unit to determine whether or not the process identification information coincides with a number of its own process;
        an extraction unit to extract the command information corresponding to the process identification information from the second area when the determination unit determines that the process identification information coincides with the number of its own process;
        an execution unit to execute a process corresponding to the command information extracted by the extraction unit; and
        a writing unit to write a return value obtained by executing the process corresponding to the command information into the storage area of the RFID tag,
    wherein the writing unit writes the return value obtained by executing a process corresponding to a first command information extracted by the extraction unit in a first process of the plurality of processes into the storage area of the RFID tag, and
    the return value is read from the storage area of the RFID tag by the antenna unit in a second process after the first process and is used as a parameter for a process corresponding to second command information extracted by the extraction unit in the second process.

2. The RFID system according to claim 1, wherein the extraction unit refers to result information corresponded to the command information and the process identification information stored in the storage area and extracts command information corresponding to the process identification information indicating a process that is not performed yet.

3. The RFID system according to claim 2, wherein the command information is comprised of a command indicating a process concerning a manufacturing process and a test process of a first article on a production line and parameter data used when executing the command.

4. The RFID system according to claim 3, further comprising;
    a database to store the first article and version number information of the first article for each group of the first article corresponding to position information indicating a place where the first article is classified and stored,
    wherein when an RFID tag attached to a second article classifying and storing the first article is detected, the control unit performs a process for reflecting the first article, the version number information and the position information of the first article stored in the RFID tag attached to the second article to the database, and
    when the RFID tag attached to the first article is detected, the extraction unit extracts command information indicating a process of reading the version number information from the database and writing the version number information into said RFID tag from the storage area of the RFID tag attached to the first article.

5. The RFID system according to claim 3, wherein when the antenna unit detects the RFID tag, the control unit sequentially performs processes to be subsequently performed using return values previously obtained by executing a command, according to commands of a computation process for obtaining data for test, a test and an analysis process of a test result.

6. The RFID system according to claim 3, wherein when the antenna unit detects the RFID tag, the control unit performs a process for issuing a production instruction to a later process by a just-in-time system.

7. The RFID system according to claim 1, wherein the control unit refers to a flag held by the RFID system and determines whether to perform a process on the basis of command information described in the storage area of the RFID tag.

8. A control method in an RFID system provided with a plurality of processes, the method comprising
    detecting an RFID tag, the RFID tag including a storage area, the storage area including a first area to store ID information and a second area to store process identification information and command information corresponding to the process identification information;
    determining whether or not the process identification information coincides with a number of its own process;
    extracting command information corresponding to the process identification information from the second area when the determining determines that the process identification information coincides with the number of its own process;

executing a process corresponding to the command information extracted by the extracting;

writing a return value obtained by the executing the process corresponding to the command information into the storage area of the RFID tag, wherein the writing writes the return value obtained by executing a process corresponding to a first command information extracted by the extraction unit in a first process of the plurality of processes into the storage area of the RFID tag; and reading, from the storage area in a second process after the first process, the return value to be used as a parameter for a process corresponding to second command information extracted by the extraction unit in the second process.

9. An RFID tag used in an RFID system provided with a plurality of processes, the RFID tag comprising a storage area including a first area to store ID information and a second area to store process identification information and command information corresponding to the process identification information, wherein the RFID tag transmit a electro-magnetic wave which is detected by an antenna unit included in the RFID system, the antenna unit reading and writing the storage area of the RFID tag; wherein the process identification information is used to determine whether or not the process identification information coincides with a number of its own process by a determination unit included in the RFID system, wherein a process corresponding to the command information is executed by an execution unit included in the RFID system when the determination indicates that the process identification information coincides with the number of its own process, and wherein a return value obtained by executing a process corresponding to a first command information in a first process of the plurality of processes, the return value is written into the storage area of the RFID tag by a writing unit included in the RFID system, and the return value is read from the storage area by the antenna unit in a second process after the first process and is used as a parameter for a process corresponding to second command information in the second process.

* * * * *